US012644741B2

(12) United States Patent
Yamashita et al.

(10) Patent No.: US 12,644,741 B2
(45) Date of Patent: Jun. 2, 2026

(54) CLAMP-ON ULTRASONIC FLOWMETER INCLUDING A TEMPERATURE MEASURING UNIT

(71) Applicant: FUJI ELECTRIC CO., LTD., Kawasaki (JP)

(72) Inventors: Shiori Yamashita, Asaka-city (JP); Takuya Shibasaki, Ootsuki-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 276 days.

(21) Appl. No.: 18/497,434

(22) Filed: Oct. 30, 2023

(65) Prior Publication Data

US 2024/0210224 A1 Jun. 27, 2024

(30) Foreign Application Priority Data

Dec. 23, 2022 (JP) ................................. 2022-206240

(51) Int. Cl.
*G01F 1/667* (2022.01)
*G01K 13/02* (2021.01)

(52) U.S. Cl.
CPC ............. *G01F 1/667* (2013.01); *G01K 13/02* (2013.01)

(58) Field of Classification Search
CPC .. G01K 1/16; G01K 1/18; G01K 1/14; G01K 1/143; G01K 2007/163; G01N 29/22; G01N 29/326; G01F 15/02; G01F 1/662; G02K 13/026; G02K 13/02
USPC ....................................................... 374/185
See application file for complete search history.

(56) References Cited

U.S. PATENT DOCUMENTS

| | | | |
|---|---|---|---|
| 6,257,758 B1 * | 7/2001 | Culbertson ............... | G01K 7/02 374/E7.004 |
| 6,264,363 B1 * | 7/2001 | Takahashi ................. | G01K 7/22 374/185 |
| 6,588,268 B1 * | 7/2003 | Yamagishi .............. | G01F 1/699 73/204.26 |
| 6,607,302 B2 * | 8/2003 | Lyle ......................... | G01K 1/16 374/185 |
| 7,001,069 B2 * | 2/2006 | Phipps ..................... | G01K 1/16 374/208 |
| 7,080,940 B2 * | 7/2006 | Gotthold ................... | G01J 5/02 374/161 |

(Continued)

FOREIGN PATENT DOCUMENTS

| | | |
|---|---|---|
| CN | 101680794 A | 3/2010 |
| JP | 2021-015090 A | 2/2021 |

OTHER PUBLICATIONS

Taiwanese Office Action of Taiwanese Patent Application No. 112141359 issued on Aug. 30, 2024, 8 pp.

*Primary Examiner* — Tran M. Tran
(74) *Attorney, Agent, or Firm* — HAUPTMAN HAM, LLP

(57) ABSTRACT

A clamp-on type ultrasonic transducer that uses ultrasonic waves for measuring a flow rate of a fluid flowing inside a piping, the clamp-on type ultrasonic transducer including a temperature measuring unit that abuts against the piping and measures a temperature of the fluid via the piping. Further, an elastic member is provided between a device main body and an upper end of the temperature measuring unit, and when the piping is clamped, while a piping contacting surface of the temperature measuring unit is pressed to the piping, a lower surface of the temperature measuring unit abuts against the piping.

5 Claims, 7 Drawing Sheets

(56) References Cited

U.S. PATENT DOCUMENTS

| | | | | |
|---|---|---|---|---|
| 7,082,810 B2 * | 8/2006 | Sakamoto | G01N 29/02 | |
| | | | 310/326 | |
| 7,507,024 B2 * | 3/2009 | Takahashi | G01K 1/08 | |
| | | | 374/185 | |
| 7,740,403 B2 * | 6/2010 | Irrgang | G01K 1/12 | |
| | | | 374/185 | |
| 8,935,843 B2 * | 1/2015 | Boguhn | G01F 1/684 | |
| | | | 73/170.12 | |
| 9,028,140 B2 * | 5/2015 | Kamrat | G01K 13/02 | |
| | | | 374/100 | |
| 9,091,599 B2 * | 7/2015 | Lukach, Jr. | G01K 1/16 | |
| 9,417,138 B2 * | 8/2016 | Krampert | G01K 13/00 | |
| 10,112,520 B2 * | 10/2018 | Becher | E01C 19/08 | |
| 10,156,483 B2 * | 12/2018 | Yoshihara | G01K 1/16 | |
| 10,190,896 B2 * | 1/2019 | Makino | G01K 1/143 | |
| 10,203,234 B2 * | 2/2019 | Ishikawa | G01F 1/662 | |
| 10,215,598 B2 * | 2/2019 | Furey | G01D 11/30 | |
| 10,481,010 B2 * | 11/2019 | Yamana | G01K 1/08 | |
| 10,656,022 B2 * | 5/2020 | Tanaka | B60L 58/24 | |
| 10,768,054 B2 * | 9/2020 | Lyon | H01R 13/111 | |
| 10,859,445 B2 * | 12/2020 | Smith | G01D 11/245 | |
| 10,989,608 B2 * | 4/2021 | Inagawa | G01K 1/16 | |
| 11,280,684 B2 * | 3/2022 | Lilleland | G01K 7/02 | |
| 11,353,213 B2 * | 6/2022 | Dalla Vecchia | G01K 1/143 | |
| 11,378,463 B2 * | 7/2022 | McColl | G01K 1/16 | |
| 11,378,464 B2 * | 7/2022 | Mohite | G01K 1/143 | |
| 11,408,775 B2 * | 8/2022 | Matsushima | G01K 1/14 | |
| 11,428,584 B2 * | 8/2022 | Suzuki | G01K 1/12 | |
| 11,506,543 B2 * | 11/2022 | Park | H01H 11/00 | |
| 11,585,698 B2 * | 2/2023 | Liu | G01K 1/08 | |
| 11,703,395 B2 * | 7/2023 | Barton | G01K 1/18 | |
| | | | 374/179 | |
| 11,808,636 B2 * | 11/2023 | Noel | G01K 1/143 | |
| 11,940,330 B2 * | 3/2024 | Nakayama | G01K 7/22 | |
| 12,025,503 B2 * | 7/2024 | Nakayama | G01K 1/146 | |
| 12,224,534 B2 * | 2/2025 | Fukuchi | H01R 13/405 | |
| 12,372,416 B2 * | 7/2025 | Lilleland | G01K 1/16 | |
| 2006/0238212 A1 * | 10/2006 | Lopez | G01K 1/16 | |
| | | | 374/E1.021 | |
| 2007/0186684 A1 | 8/2007 | Pham | | |
| 2008/0028849 A1 | 2/2008 | Matsubara | | |
| 2010/0187392 A1 | 7/2010 | Berger et al. | | |
| 2018/0172521 A1 * | 6/2018 | Diglio | G01K 1/026 | |
| 2019/0187002 A1 * | 6/2019 | Baba | G01K 7/22 | |
| 2019/0368943 A1 * | 12/2019 | Yamana | G01K 1/08 | |
| 2020/0149974 A1 * | 5/2020 | Hand | G01K 7/02 | |
| 2023/0128353 A1 * | 4/2023 | Jung | G01K 1/14 | |
| | | | 188/1.11 E | |
| 2023/0175898 A1 * | 6/2023 | Basiana Martí | G01K 13/02 | |
| | | | 374/1 | |
| 2024/0219245 A1 * | 7/2024 | Wehring | G01K 7/223 | |

* cited by examiner

CLAMP-ON ULTRASONIC FLOWMETER INCLUDING A TEMPERATURE MEASURING UNIT

CROSS-REFERENCE TO RELATED APPLICATION(S)

The present application claims priority to and incorporates by reference the entire contents of Japanese Patent Application No. 2022-206240 filed in Japan on Dec. 23, 2022.

BACKGROUND

The present disclosure relates to a clamp-on type ultrasonic flowmeter.

In the related art, an ultrasonic flowmeter is known that uses ultrasonic waves for measuring the flow rate of a fluid flowing inside a piping. In such an ultrasonic flowmeter, transmission and reception of ultrasonic waves is performed between a piezoelectric device disposed on the upstream side of the piping and a piezoelectric device disposed on the downstream side of the piping, and the flow rate of the fluid flowing inside the piping is measured from the difference in the propagation time of the ultrasonic waves.

As far as such an ultrasonic flowmeter is concerned, a diagonal-incident-angle type ultrasonic flowmeter is known (for example, refer to Japanese Laid-open Patent Publication No. 2021-15090). In a diagonal-incident-angle type ultrasonic flowmeter, transmission and reception of ultrasonic waves is performed at an angle with respect to the piping and is performed between a single compact piezoelectric device disposed on the upstream side of a piping and a single compact piezoelectric device disposed on the downstream side of the piping; and the flow rate of the fluid flowing inside the piping is measured from the difference in the propagation time of the ultrasonic waves. In a diagonal-incident-angle type ultrasonic flowmeter, piezoelectric devices are attachable to the piping according to the clamp-on method. In the clamp-on method, piezoelectric devices can be attached to an existing piping without having to cut the piping.

SUMMARY

There is a need for providing a clamp-on type ultrasonic flowmeter in which, even when an ultrasonic transducer and a temperature measuring unit are disposed in the device main body, the flow rate measurement function of the ultrasonic transducer as well as the temperature measurement performance of the temperature measuring unit can be implemented in full measure.

According to an embodiment, a clamp-on type ultrasonic transducer that uses ultrasonic waves for measuring a flow rate of a fluid flowing inside a piping, includes a temperature measuring unit that abuts against the piping and measures a temperature of the fluid via the piping. Further, an elastic member is provided between a device main body and an upper end of the temperature measuring unit, and when the piping is clamped, while a piping contacting surface of the temperature measuring unit is pressed to the piping, a lower surface of the temperature measuring unit abuts against the piping.

DETAILED DESCRIPTION

In the related art, in the device main body of a clamp-on type ultrasonic flowmeter, when a temperature measuring unit is to be disposed for measuring the temperature of the fluid flowing inside the piping, the piping contacting surface of the temperature measuring unit needs to be kept abutted to the piping. When the temperature measuring unit is fixed to the device main body, if the piping contacting surface of the temperature measuring unit protrudes more than the piping contacting surface of the ultrasonic transducer; then, at some places, the piping contacting surface of the ultrasonic transducer cannot make contact with the piping. That results in a decline in the flow rate measurement performance. On the other hand, when the temperature measuring unit is fixed to the device main body, if the piping contacting surface of the temperature measuring unit recedes deeper than the piping contacting surface of the ultrasonic transducer; then, although the piping contacting surface of the ultrasonic transducer can sufficiently make contact with the piping, the piping contracting surface of the temperature measuring unit cannot make contact with the piping. That results in a decline in the temperature measurement performance.

An exemplary embodiment of a clamp-on type ultrasonic flowmeter according to the present disclosure is described in detail with reference to the accompanying drawings. However, the present disclosure is not limited by the embodiment described below.

OVERALL CONFIGURATION

Figure 1:
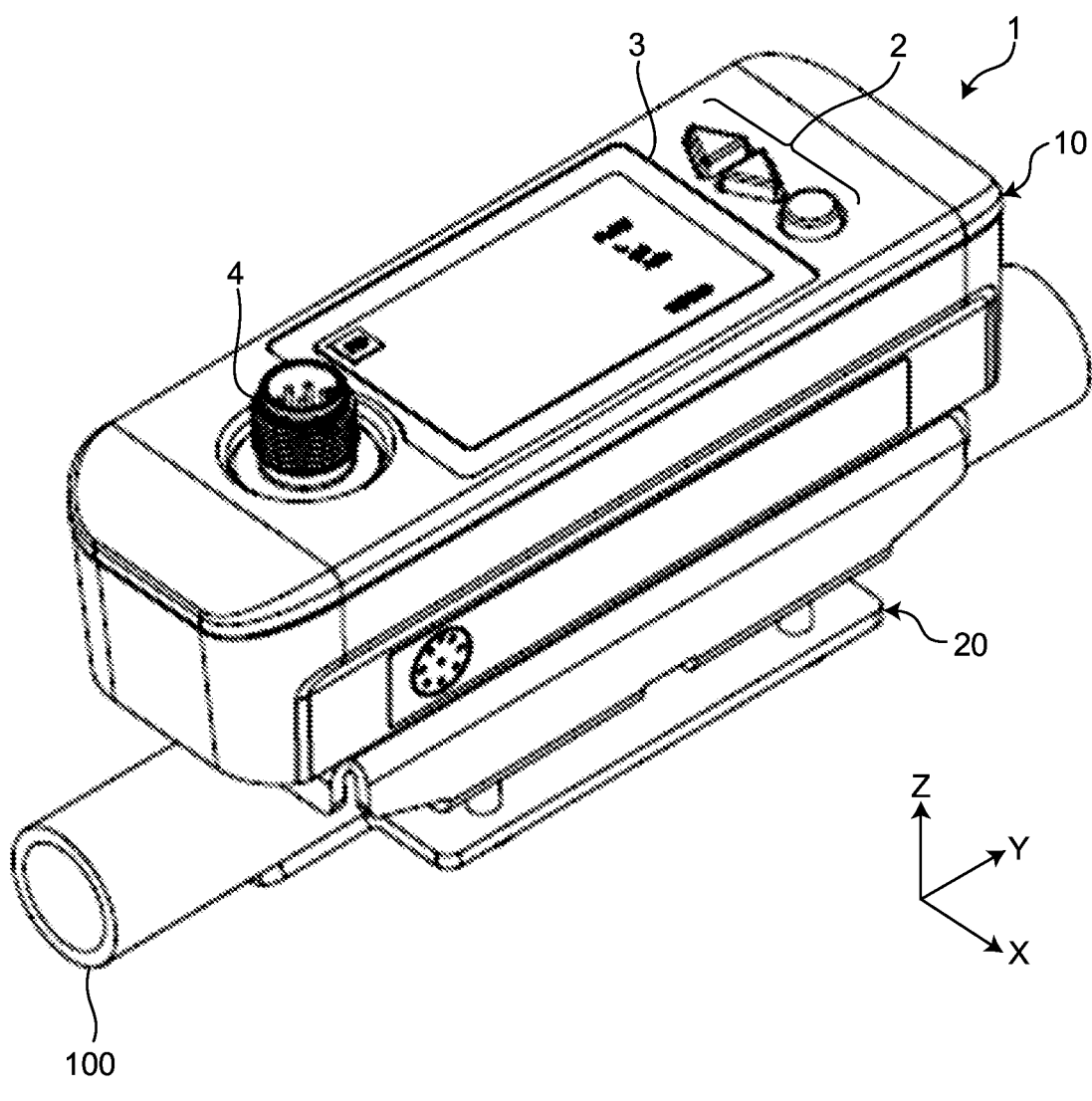
FIG. 1 is a perspective view of a clamp-on type ultrasonic flowmeter according to an embodiment of the present disclosure.
Figure 2:
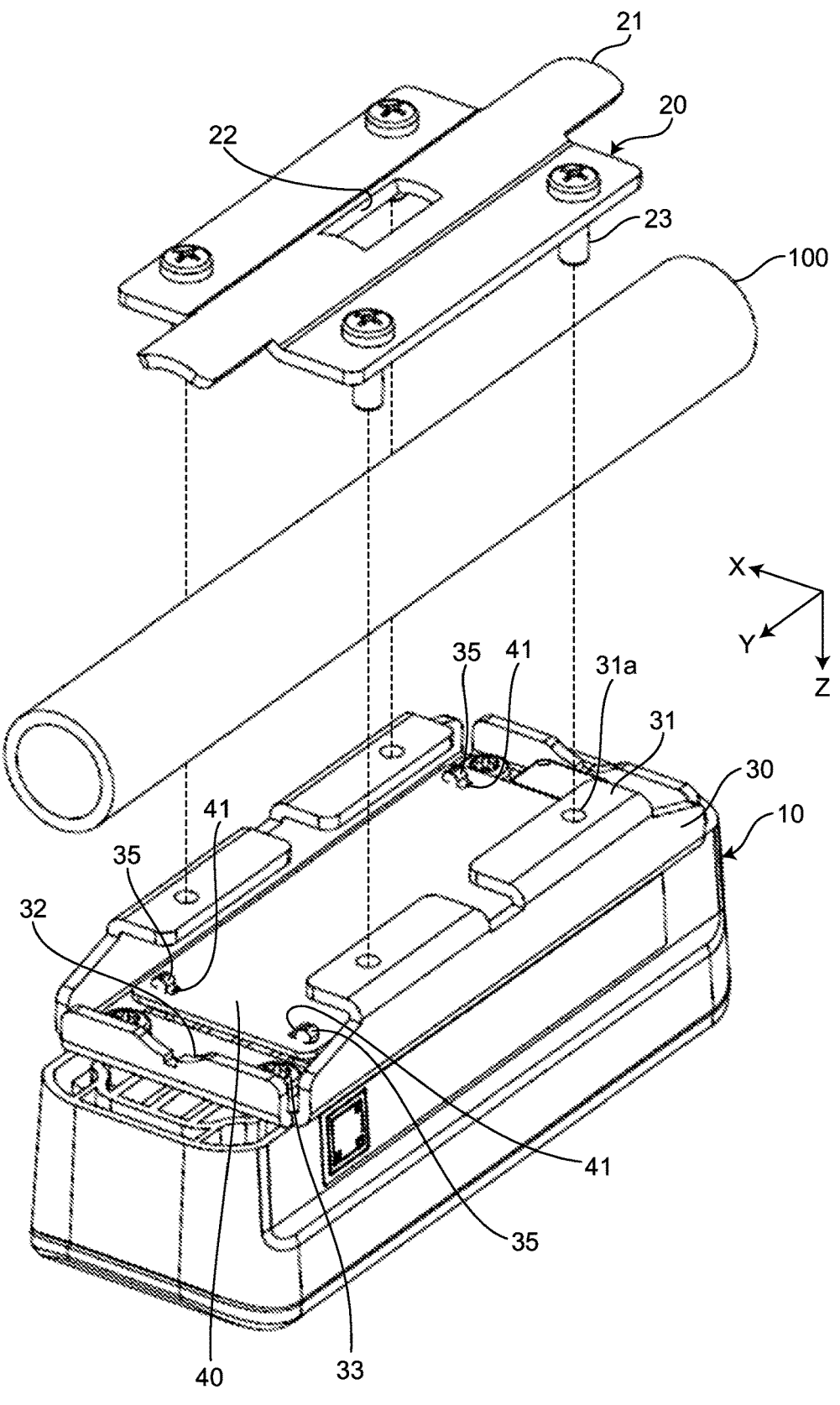
FIG. 2 is an exploded perspective view of the clamp-on type ultrasonic flowmeter illustrated in FIG. 1.
Figure 3:
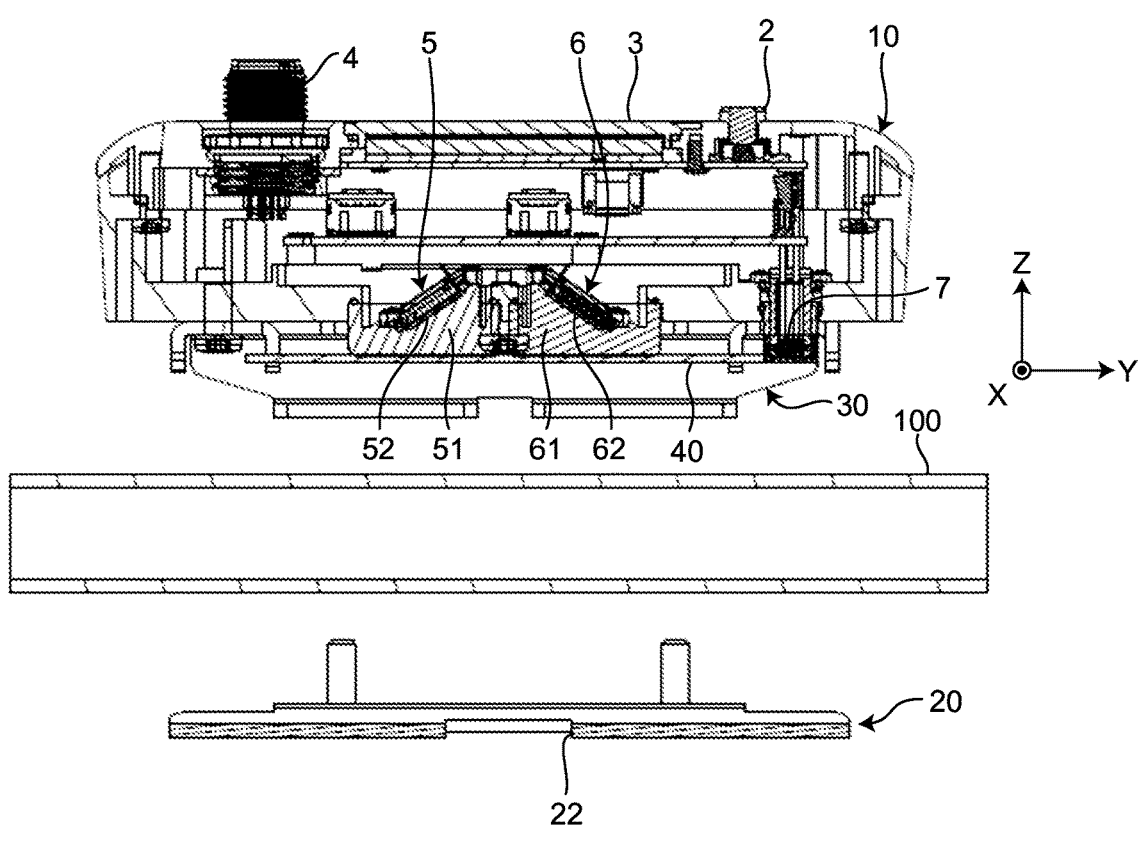
FIG. 3 is vertical cross-sectional view of the clamp-on type ultrasonic flowmeter illustrated in FIG. 2.
Figure 4:
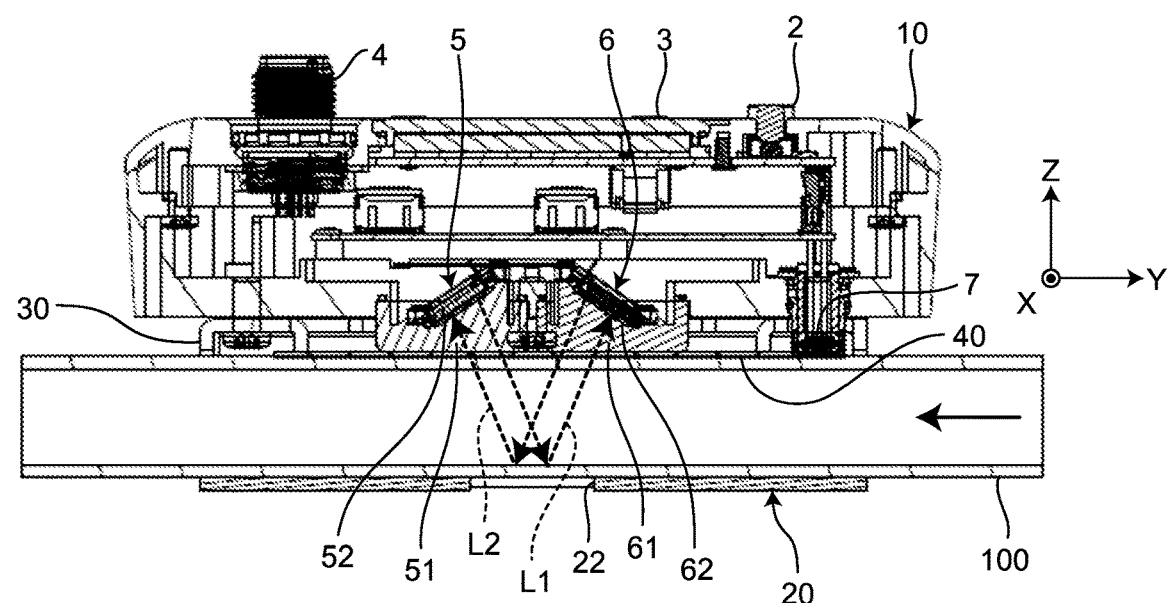
FIG. 4 is a vertical cross-sectional view at the time of clamping performed with respect to the clamp-on type ultrasonic flowmeter illustrated in FIG. 1.

FIG. 1 is a perspective view of a clamp-on type ultrasonic flowmeter 1 according to the embodiment of the present disclosure. FIG. 2 is an exploded perspective view of the clamp-on type ultrasonic flowmeter 1 illustrated in FIG. 1. FIG. 3 is vertical cross-sectional view of the clamp-on type ultrasonic flowmeter 1 illustrated in FIG. 2. FIG. 4 is a vertical cross-sectional view at the time of clamping performed with respect to the clamp-on type ultrasonic flowmeter 1 illustrated in FIG. 1. As illustrated in FIGS. 1 to 4, the clamp-on type ultrasonic flowmeter 1 includes a main-body-side piping attachment portion 30 mounted on a device main body 10 and includes an outer-side piping attachment portion 20; is clamped to a piping 100, through which a fluid flows, from both sides using the main-body-side piping attachment portion 30 and the outer-side piping attachment portion 20; and measures the flow rate of the fluid flowing through the piping 100.

The clamp-on type ultrasonic flowmeter 1 includes ultrasonic transducers 5 and 6 that are placed opposite to each other, that transmit ultrasonic signals to the fluid flowing inside the piping 100, and that receive ultrasonic signals coming from the fluid flowing inside the piping 100. On a tilted surface of a wedge 51 of the ultrasonic transducer 5, a piezoelectric device 52 is attached. Similarly, on a tilted surface of a wedge 61 of the ultrasonic transducer 6, a piezoelectric device 62 is attached. Thus, from the undersurface of the wedges 51 and 61 and via an acoustic coupler rubber 40, the ultrasonic transducers 5 and 6 transmit ultrasonic signals to and receive ultrasonic signals from the piping 100 at an angle.

As far as the clamping to the piping 100 using the device main body 10 and the outer-side piping attachment portion 20 is concerned, the piping 100 is sandwiched between the main-body-side piping attachment portion 30, which is attached to the device main body 10, and the outer-side piping attachment portion 20; and screws 23 are used for fastening purposes. That is, the screws 23 are screwed into screw holes 31 that are formed on flanges 31 of the main-body-side piping attachment portion 30, so that the clamping to the piping 100 is done. Meanwhile, a piping positioning recess 32 is formed at the end portion in the +Y direction of the main-body-side piping attachment portion 30.

As far as the flow rate measurement performed by the clamp-on type ultrasonic flowmeter 1 is concerned, when the clamp-on type ultrasonic flowmeter 1 is clamped to the piping 100; for example, an ultrasonic signal L1 is transmitted from the ultrasonic transducer 5; the ultrasonic signal L1 that has returned from the piping 100 because of reflection is received by the ultrasonic transducer 6; and the propagation time of the ultrasonic signal L1 is measured. Moreover, an ultrasonic signal L2 is transmitted from the ultrasonic transducer 6; the ultrasonic signal L2 that has returned from the piping 100 because of reflection is received by the ultrasonic transducer 5; and the propagation time of the ultrasonic signal L2 is measured. Based on the propagation time of each of the ultrasonic signals L1 and L2, the flow velocity of the fluid is calculated and the flow rate per unit time is obtained. Meanwhile, the flow rate can also be obtained in the form of the cumulative flow rate. At that time, using a temperature measuring unit 7 that is attached to the device main body 10, the temperature of the fluid is measured via the piping 100, and temperature correction for the flow velocity is performed accordingly. Meanwhile, the setting is such that the ultrasonic signals L1 and L2 pass through the axis of the piping 100.

The device main body 10 includes an operating unit 2, a display unit 3, and a cable connection unit 4. Moreover, a control unit (not illustrated) is also included in the device main body 10. The operating unit 2 is an input interface that enables input of a variety of information and receives input of information in response to selection of preset information. The display unit 3 is an output interface that enables output of a variety of information and is used to display the flow rate [liter/min], the cumulative flow rate [liter], and the status [normal/malfunction]. The cable connection unit 4 is a connector for establishing connection with an external power supply line and with a cable including a signal line to an external device. In response to an instruction received from the operating unit 2, the control unit performs transmission-reception control of the ultrasonic transducers 5 and 6; calculates the flow velocity based on the difference in propagation time and based on the temperature measured by the temperature measuring unit 7; displays the result and the state in the display unit 3; and outputs the result and the state to the outside via the cable connection unit 4.

The acoustic coupler rubber 40 is an elastic rubber functioning as an acoustic coupler for ensuring acoustic coupling of the transmission-reception surfaces of the ultrasonic transducers 5 and 6 with the piping 100. A related-art acoustic coupler rubber has a three-dimensional structure covering the wedges of the ultrasonic transducers. In contrast, in the present embodiment, the acoustic coupler rubber 40 has a flat-plate structure.

In the central part of the main-body-side piping attachment portion 30, an opening is formed through which the ultrasonic transmission-reception surfaces of the ultrasonic transducers 5 and 6 protrude in the −Z direction. Moreover, around the opening, four claws 35 are erected toward the −Z direction. Herein, the protrusion of the ultrasonic transmission-reception surfaces in the −Z direction at the opening matches with the thickness of the opening. The leading-end bent portions of the claws 35 are oriented in the +X direction.

In the acoustic coupler rubber 40, four engagement holes 41 are formed at the positions corresponding to the claws 35. The leading-end bent positions of the claws 35 correspond to the thickness of the acoustic coupler rubber 40. When the claws 35 engage in the engagement holes 41, the acoustic coupler rubber 40 gets attached to the main-body-side piping attachment portion 30. In that case, the acoustic coupler rubber 40 abuts against the ultrasonic transmission-reception surfaces of the ultrasonic transducers 5 and 6. Moreover, due to the clamping to the piping 100, the acoustic coupler rubber 40 adheres tightly to the ultrasonic transmission-reception surfaces of the ultrasonic transducers 5 and 6.

More particularly, regarding the attachment of the acoustic coupler rubber 40, for example, the two claws 35 in the +X direction are engaged in the two engagement holes 41 formed in the +X direction of the acoustic coupler rubber 40 and, while stretching the acoustic coupler rubber 40 in the −X direction, the two claws 35 in the −X direction are engaged in the two engagement holes 41 formed in the −X direction of the acoustic coupler rubber 40. Then, the main-body-side piping attachment portion 30, to which the acoustic coupler rubber 40 has been attached, is attached to the device main body 10. At this stage of attachment to the device main body 10, the acoustic coupler rubber 40 abuts against the ultrasonic transmission-reception surfaces of the ultrasonic transducers 5 and 6.

Because of the flat-plate structure of the acoustic coupler rubber 40, it is easy to control the surface roughness and the vulcanization condition. Moreover, since molding is not used, unevenness does not easily occur in the material, thereby making it possible to ensure excellent acoustical properties. Moreover, as a result of not using molding, the cost can also be held down. Furthermore, in addition to having a flat-plate structure and being easy to handle, the acoustic coupler rubber 40 is also attachable just by engaging the claws 35 in the engagement holes 41. As a result, attachment and detachment of the acoustic coupler rubber 40 becomes easier.

TEMPERATURE MEASURING UNIT

The temperature measuring unit 7 is disposed adjacent to the ultrasonic transducers 5 and 6. Herein, the piping contacting surface of the temperature measuring unit 7 needs to be coplanar with the piping contacting surface of the ultrasonic transducers 5 and 6 (the acoustic coupler rubber 40). However, due to the clamping to the piping 100, the acoustic coupler rubber 40 loses shape in the Z direction. Hence, if the temperature measuring unit 7 is fixedly disposed in the device main body 10, then the piping contacting surface of the temperature measuring unit 7 becomes higher or lower in level than the piping contacting surface of the acoustic coupler rubber 40, and neither the flow measurement performance of the ultrasonic transducers 5 and 6 nor the temperature measurement performance of the temperature measuring unit 7 can be implemented in full measure.

In the present embodiment, the piping contacting surface of the temperature measuring unit 7 is allowed to perform an up-and-down motion so as to become able to follow the piping contacting surface of the acoustic coupler rubber 40. With reference to FIG. 3, the acoustic coupler rubber 40 is maintaining its shape before the clamping. However, with reference to FIG. 4, the acoustic coupler rubber 40 has lost its shape at the time of clamping. That is, at the time of clamping, the piping contacting surface of the acoustic coupler rubber 40 gets displaced in the Z direction. However, the piping contacting surface of the temperature measuring unit 7 too is displaced in the Z direction, and remains coplanar with the piping contacting surface of the acoustic coupler rubber 40.

That is, an elastic member 8 is placed in between the device main body 10 and the upper end of the temperature measuring unit 7; and, accompanying the clamping to the piping 100, the piping contacting surface of the temperature measuring unit 7 is pressed against the piping 100, so that the undersurface (the piping contacting surface) of the temperature measuring unit 7 is abutted against the piping 100.

Figure 5:
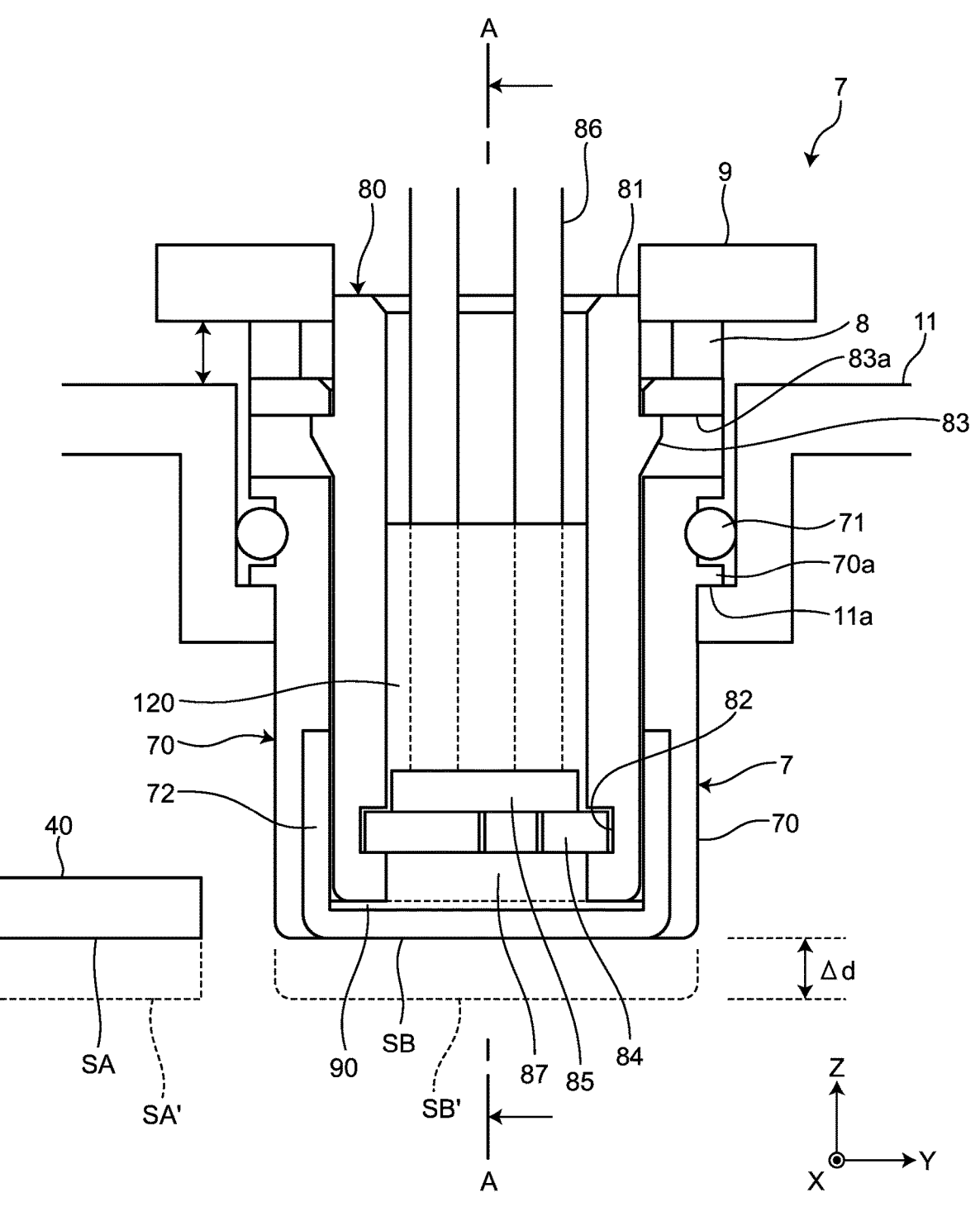
FIG. 5 is a vertical cross-sectional view of a temperature measuring unit.
Figure 6:
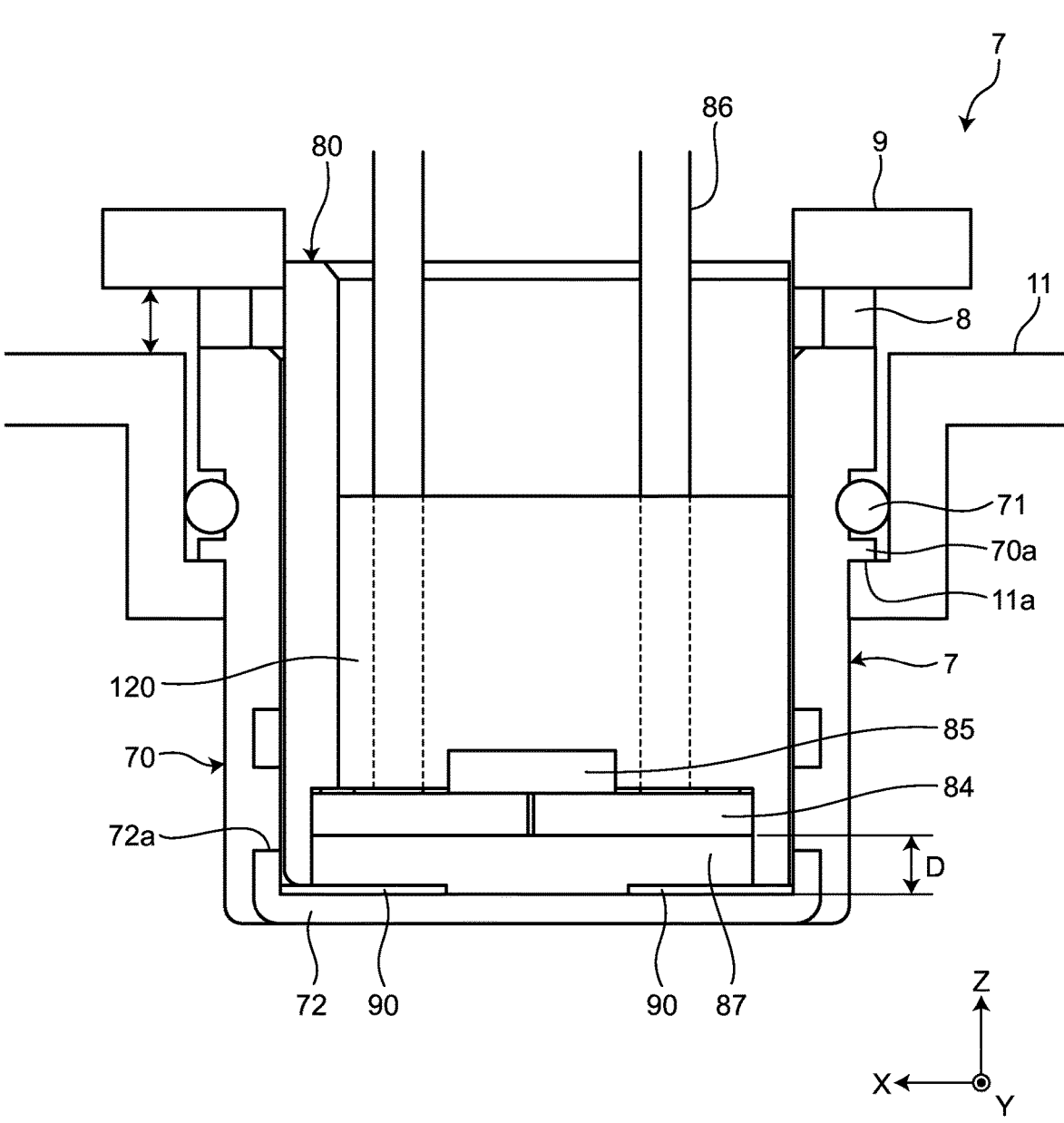
FIG. 6 is a horizontal cross-sectional view of the temperature measuring unit.
Figure 7:
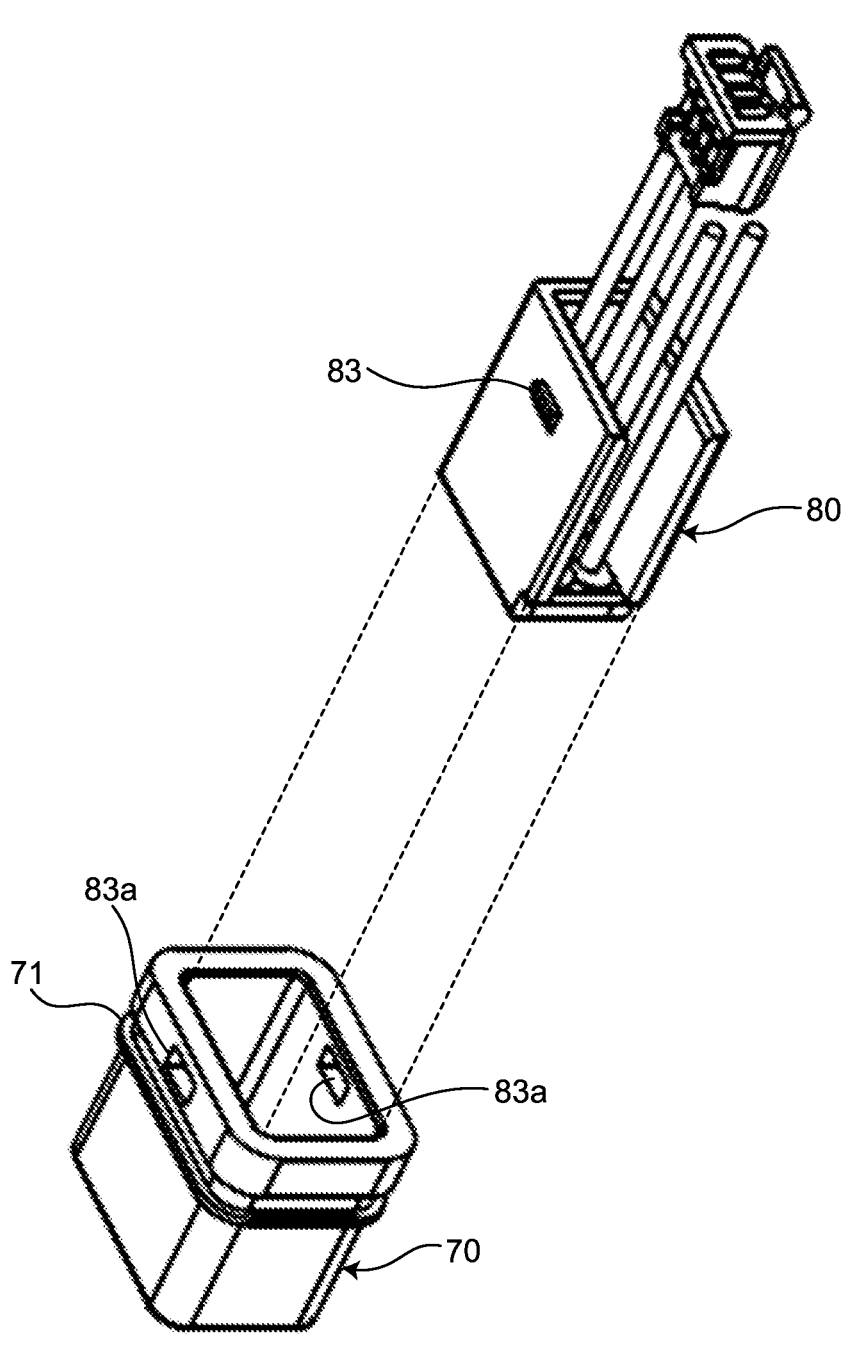
FIG. 7 is an exploded perspective view of the temperature measuring unit.
Figure 8:
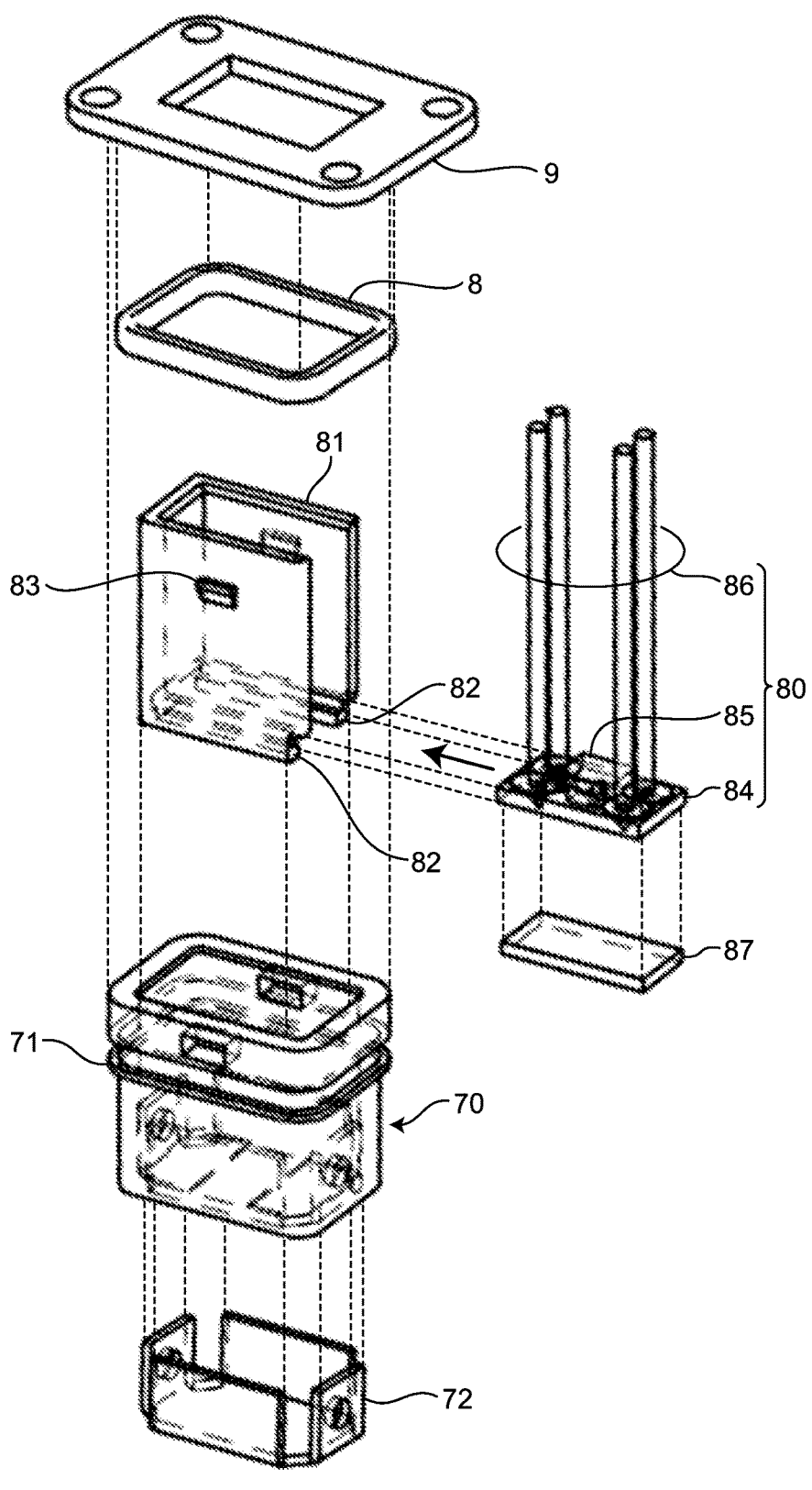
FIG. 8 is a detailed exploded perspective view of the temperature measuring unit.

FIG. 5 is a vertical cross-sectional view of the temperature measuring unit 7. FIG. 6 is a horizontal cross-sectional view of the temperature measuring unit 7. FIG. 7 is an exploded perspective view of the temperature measuring unit 7. FIG. 8 is a detailed exploded perspective view of the temperature measuring unit 7.

As illustrated in FIGS. 5 to 8, the temperature measuring unit 7 includes a bottomed outer cylindrical portion 70 which has a heat-transfer metallic plate 72 disposed on the undersurface; and includes an inner cylindrical portion 80 which is inserted inside the outer cylindrical portion 70 from above, which is fixedly disposed inside the outer cylindrical portion 70, and in which a temperature sensor substrate 84 is disposed with a temperature sensor 85 mounted thereon. The outer cylindrical portion 70 and the inner cylindrical portion 80 have a rectangular cross-sectional shape, and one side surface of the inner cylindrical portion 80 has an opening formed thereon.

In the bottom portion of the outer cylindrical portion 70, the heat-transfer metallic plate 72 is embedded into resin. The heat-transfer metallic plate 72 has the shape in which all sides are bent in the Z direction. From the undersurface of the outer cylindrical portion 70, the heat-transfer metallic plate 72 remains exposed; and that undersurface serves as a piping contacting surface SB. A piping contacting surface SA represents the undersurface of the acoustic coupler rubber 40. Meanwhile, on the heat-transfer metallic plate 72, an anchor hole 72a is formed, and is used as a resin anchor.

On the inner cylindrical portion 80, a slit 82 is formed that extends horizontally to the position at a predetermined distance from the undersurface of the outer cylindrical portion 70. The temperature sensor substrate 84 is slid and fit into the slit 82 from the side of the opening formed on the side surface and is positioned in the vertical direction, so that the distance between the heat-transfer metallic plate 72 and the temperature sensor 85 is maintained to be constant. More particularly, a constant distance D is maintained between the upper surface of the heat-transfer metallic plate 72 and the lower surface of the temperature sensor substrate 84. The slit 82 is formed as a groove on the inside of an inner-cylinder main body 81.

To the temperature sensor substrate 84, four lead wires 86 are connected that extend to the outside through the inside of the inner cylindrical portion 80 and that are connected to a control unit via a connection interface. For example, the connection between the temperature sensor substrate 84 and the lead wires 86 is established by forming connection holes on the temperature sensor substrate 84 and the leading ends of the lead wires 86 are inserted into the connection holes followed by forming a solder joint. However, there is a possibility of the lead wires 86 protruding from the undersurface of the temperature sensor substrate 84. Hence, in order to prevent the lead wires 86 from making a contact with the heat-transfer metallic plate 72, an insulating resin partition wall 90 is formed as a film on the upper surface of the bottom of the heat-transfer metallic plate 72. The insulating resin partition wall 90 is formed at the time of resin molding of the outer cylindrical portion 70. The insulating resin partition wall 90 is formed at least at the positions corresponding to the connection of the lead wires 86. An insulating heat-conductive grease 87 is applied to cover the entire lower surface of the temperature sensor substrate 84.

Moreover, the insulating heat-conductive grease 87 is filled in between the temperature sensor substrate 84 and the heat-transfer metallic plate 72, and an insulating resin 120 is filled in the upper portion of the temperature sensor substrate 84. Meanwhile, the insulating heat-conductive grease 87 can also be an insulating heat-conductive adhesive member. Thus, an insulating material is filled not only in between the temperature sensor substrate 84 and the heat-transfer metallic plate 72 but also in the upper portion of the temperature sensor substrate 84. As a result, in the portion between the heat-transfer metallic plate 72 and the lead wires 86 in which a static electricity is applied, it becomes possible to prevent electrostatic discharge from occurring. Moreover, the insulating heat-conductive grease 87 and the insulating resin 120 also contribute in enhancing the waterproof property.

Meanwhile, the positioning of the inner cylindrical portion 70 is achieved when a protrusion 83 formed on the outer periphery of the inner cylindrical portion 80 engages with a protrusion engagement hole 83a formed on the outer cylindrical portion 70.

Moreover, on the outer periphery of the outer cylindrical portion 70, a step 70a is formed. In the lower portion of the step 70a, a flange 11a of a device supporting member 11, which is a member of the device main body 10, gets engaged and enables stopping the downward movement (in the −Z direction) of the temperature measuring unit 7. In the upper portion of the step 70a, a seal 71 is attached for the purpose of sealing the space between the side surfaces of the device supporting member 11. As a result of such sealing, it becomes possible to achieve waterproofing of the device main body 10.

The elastic member 8 is placed in between the upper end of the outer cylindrical portion 70 and a device main body attachment member 9 that is fastened to the side of the device main body 10. As the elastic member 8, it is possible to use a spring. Alternatively, herein, an elastic rubber is used. The elastic member 8 is pressed by the device main body attachment member 9. The device main body attachment member 9 presses the elastic member 8 while allowing expansion and contraction in the +Z direction of the outer cylindrical portion 70, to which the inner cylindrical portion 80 is fixed. The reason for using an elastic rubber as the elastic member 8 is that, with the displacement nearly equal to the displacement of the acoustic coupler rubber 40, nearly equal amount of elasticity is exerted.

As a result, while being sealed, the temperature measuring unit 7 becomes able to perform an up-and-down motion following the displacement of the piping contacting surfaces of the ultrasonic transducers 5 and 6. With reference to FIG. 5, accompanying the clamping to the piping 100, the position of a piping contacting surface SA' of the acoustic coupler rubber 40 before the clamping gets displaced to the piping contacting surface SA; and, accompanying that displacement, the position of a piping contacting surface SB' of the temperature measuring unit 7 gets displaced to the piping contacting surface SB. Hence, a displacement Δd occurs from the piping contacting surface SB to the piping contacting surface SB' of the temperature measuring unit 7, and the piping contacting surface SA of the acoustic coupler rubber 40 and the piping contacting surface SB of the temperature measuring unit 7 coincide with each other. As a result, the piping contacting surface SA of the acoustic coupler rubber 40 as well as the piping contacting surface SB of the temperature measuring unit 7 makes a normal contact with the piping 100. Hence, the flow rate measurement performance of the ultrasonic transducers 5 and 6 as well as the temperature measurement performance of the temperature measuring unit 7 can be implemented in full measure. Meanwhile, before the clamping to the piping 100, the position of the piping contacting surface SB' of the temperature measuring unit 7 can have a smaller displacement than the displacement Δd and can be positioned more toward the +Z direction than the position of the piping contacting surface SA' of the acoustic coupler rubber 40.

Meanwhile, the present disclosure is not limited to the embodiment described above, and it goes without saying that modifications can be freely made without departing from the scope of the present disclosure.

In the present disclosure, even when an ultrasonic transducer and a temperature measuring unit are disposed in the device main body, the flow rate measurement function of the ultrasonic transducer as well as the temperature measurement performance of the temperature measuring unit can be implemented in full measure.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A clamp-on ultrasonic transducer for measuring a flow rate of a fluid flowing inside a piping, the clamp-on ultrasonic transducer comprising:

an ultrasonic transducer for emitting an ultrasonic signal into the piping for measuring the flow rate of the fluid inside the piping;

a temperature measuring unit that abuts against the piping and measures a temperature of the fluid via the piping, wherein an elastic member is provided between a device main body and an upper end of the temperature measuring unit, and when the piping is clamped, while a piping contacting surface of the temperature measuring unit is pressed to the piping, a lower surface of the temperature measuring unit abuts against the piping, wherein the temperature measuring unit includes an outer cylindrical portion in which a heat-transfer metallic plate is on a lower surface of the outer cylindrical portion, an inner cylindrical portion which is fixed inside the outer cylindrical portion, and a temperature sensor substrate having a temperature sensor is inside the inner cylindrical portion.

2. The clamp-on ultrasonic flowmeter, according to claim 1, wherein on the inner cylindrical portion, a slit extends horizontally into a sidewall of the inner cylindrical portion to a position at a predetermined distance from the outer cylindrical portion, the temperature sensor substrate extends into the slit and extends in a vertical direction outside of the slit, and a distance between the heat-transfer metallic plate and the temperature sensor is configured to be constant.

3. The clamp-on ultrasonic flowmeter according to claim 2, wherein an insulating member is between the temperature sensor substrate and the heat-transfer metallic plate, and the insulating member is contacts an upper portion of the temperature sensor substrate.

4. The clamp-on ultrasonic flowmeter according to claim 2, wherein an insulating resin partition wall is between a position corresponding to a connection portion of a lead wire and the heat-transfer metallic plate, the lead wire being connected from an upper portion side of the temperature sensor substrate.

5. The clamp-on ultrasonic flowmeter according to claim 3, wherein an insulating resin partition wall is between a position corresponding to a connection portion of a lead wire and the heat-transfer metallic plate, the lead wire being connected from an upper portion side of the temperature sensor substrate.

* * * * *